(12) United States Patent
Dubois

(10) Patent No.: US 12,152,111 B2
(45) Date of Patent: Nov. 26, 2024

(54) METHOD FOR RECYCLING THERMOPLASTIC BY SHORT DEPOLYMERISATION

(71) Applicant: Arkema France, Colombes (FR)

(72) Inventor: Jean-Luc Dubois, Millery (FR)

(73) Assignee: ARKEMA FRANCE, Colombes (FR)

( * ) Notice: Subject to any disclaimer, the term of this patent is extended or adjusted under 35 U.S.C. 154(b) by 971 days.

(21) Appl. No.: 17/049,725

(22) PCT Filed: Apr. 26, 2019

(86) PCT No.: PCT/FR2019/050987
§ 371 (c)(1),
(2) Date: Oct. 22, 2020

(87) PCT Pub. No.: WO2019/207260
PCT Pub. Date: Oct. 31, 2019

(65) Prior Publication Data
US 2021/0115216 A1   Apr. 22, 2021

(30) Foreign Application Priority Data

Apr. 27, 2018 (FR) ...................................... 1853738

(51) Int. Cl.
*C08J 11/12* (2006.01)
*C08J 11/10* (2006.01)

(52) U.S. Cl.
CPC ............... *C08J 11/12* (2013.01); *C08J 11/10* (2013.01); *C08J 2325/06* (2013.01); *C08J 2333/12* (2013.01); *C08J 2425/06* (2013.01); *C08J 2433/12* (2013.01)

(58) Field of Classification Search
CPC ........................................................ C08J 11/12
See application file for complete search history.

(56) References Cited

U.S. PATENT DOCUMENTS

| | | | | |
|---|---|---|---|---|
| 2,030,901 A * | 2/1936 | Strain | ................ | C07C 69/54 560/216 |
| 4,071,075 A * | 1/1978 | Hinkle | ................ | B30B 15/34 165/104.31 |
| 5,386,055 A * | 1/1995 | Lee | ................ | C07B 37/06 585/801 |
| 5,663,420 A * | 9/1997 | Vaughan | ................ | C07C 67/333 560/216 |
| 6,160,031 A | 12/2000 | Poree et al. | | |
| 6,184,427 B1 * | 2/2001 | Klepfer | ................ | C10G 1/10 201/2.5 |
| 9,505,901 B2 * | 11/2016 | Mohanty | ................ | B01J 8/087 |
| 2012/0136801 A1 | 5/2012 | Carlton et al. | | |
| 2014/0114097 A1 | 4/2014 | Hemmings et al. | | |
| 2014/0256850 A1 * | 9/2014 | Gerard | ................ | C08F 265/06 523/222 |
| 2015/0151498 A1 * | 6/2015 | Witte | ................ | B29C 73/34 427/140 |
| 2016/0040074 A1 * | 2/2016 | Methling | ................ | C08J 11/12 585/16 |
| 2016/0153123 A1 | 6/2016 | Da Cruz et al. | | |
| 2017/0327663 A1 * | 11/2017 | Gil | ................ | C10G 1/02 |

FOREIGN PATENT DOCUMENTS

| | | |
|---|---|---|
| EP | 0532893 A3 | 3/1994 |
| FR | 2804687 B1 | 5/2002 |
| JP | H11166184 | 6/1999 |
| JP | 2000-516274 A | 12/2000 |
| WO | WO 00/39205 | 7/2000 |

OTHER PUBLICATIONS

Lindgren et al., Innovative Food Science and Emerging Technologies, 3, 2002, 233-245 (Year: 2002).*

* cited by examiner

*Primary Examiner* — Irina Krylova
(74) *Attorney, Agent, or Firm* — Buchanan Ingersoll & Rooney PC

(57) ABSTRACT

The present invention relates to a process for the recycling of an article comprising a thermoplastic polymer P1 resin, said thermoplastic polymer P1 having been formed from base monomers, said process comprising the following stages:
heating said resin in order to convert, at least in part, the thermoplastic polymer P1 into at least two polymers P2, said at least two polymers P2 having a lower molar mass than the molar mass of said polymer P1,
cooling said at least two polymers P2 obtained after heating to a temperature substantially equal to or lower than the boiling point of said base monomers, and
dissolving said at least two polymers P2 in a solution comprising said base monomers.

17 Claims, 2 Drawing Sheets

METHOD FOR RECYCLING THERMOPLASTIC BY SHORT DEPOLYMERISATION

This application claims benefit, under U.S.C. § 119 or § 365 of PCT Application Number PCT/FR2019/050987, filed Apr. 26, 2019, and French Patent Application Number FR 1853738 filed Apr. 27, 2018, these documents being incorporated herein by reference.

TECHNICAL FIELD

The present invention relates generally to the recycling of thermoplastic resin and/or of articles comprising in particular a thermoplastic resin, especially composite articles comprising in particular a thermoplastic resin.

The invention finds applications in various industrial sectors, such as the environment or the plastics industry, and in particular those faced with the problems of recycling end-of-life products comprising thermoplastic resins.

Prior Art

In 2017, thousands of tonnes of thermoplastics were produced worldwide. Thus, the production and the recycling of thermoplastics easily appear as major challenges from an environmental and economic viewpoint. It is thus advantageous economically and from an environmental viewpoint to be able to depolymerize the polymeric resin and to obtain depolymerization products which can be reused. Among the conventional methods for the recycling of plastics, thermal pyrolysis and mechanical recycling are the most widely employed.

The thermal pyrolysis of thermoplastics consists in placing the thermoplastic object to be treated in a suitable chamber and in then heating the chamber in order for the heat to be transferred to the thermoplastic object. It makes it possible to treat thermoplastic waste and results generally in carbonaceous residues, oil and gases which cannot be reused for the production of a thermoplastic polymer matrix. Furthermore, thermal pyrolysis is difficult to adapt for large-scale use because of the waste storage problems and associated costs. In addition, thermal pyrolysis involves a particular installation with an appropriate heating device, the management of which can be dangerous given the risk of fire in particular. Additional to this is that this type of installation experiences fouling problems which are accentuated during large-scale use, involving a high maintenance cost.

In particular, in the case of polymethyl methacrylate, recycling is known in which use is made of a bed of molten lead (or other molten metals, such as: tin (Sn) or zinc (Zn)) in which the articles are ground, injected at the bottom of the bed of lead brought to a temperature of greater than 400° C. or at the surface, then decomposed. However, such a process exhibits several disadvantages. During the process, the resin is gasified and the contaminants of the article build up on the bed of lead. In the case of composites, solid residues and/or fibers accumulate continuously. This process is thus accompanied by problems of fouling of the bed of lead and of the reactor in which it is positioned, these problems being accentuated in the case of the composites because the bed of lead needs to be regularly freed from the residues at its surface. The cleaning of the reactor, and of the various elements constituting the device for recycling on a bed of molten lead, is tedious and generates toxic lead-containing byproducts. Allowance thus has to be made for the treatment of the lead-polluted waste resulting from the cleaning stages in particular, as well as the associated costs. Certain grades of polymethyl methacrylate resins also form solid residues, without these resins being easily distinguishable from the cast plates or resins which form little or no solid residues. In addition, the production of solid residues contaminated with lead (or other molten metals, such as Sn or Zn) is all the greater when the composite is rich in reinforcement, such as fibers or inorganic materials. This recycling process is thus unsatisfactory and, moreover, is unsuitable for the treatment of composites.

The process for depolymerization on a fluidized bed is also known, in which process the fluidized bed can be a bed of silica sand placed in a fluidized bed reactor. In this process, the article containing the polymer P1 resin is ground beforehand and then the ground material obtained is introduced into the reactor containing the fluidized bed under a stream of inert gas or of monomer in the gaseous state with a temperature ranging from 450° C. to 550° C. In this bed, the polymer P1 resin is rapidly heated and gasified. In the case of a composite comprising resin and fibers, for example, the resin is gasified and the fibers, freed from the resin, then remain. The remaining fibers are partly carried out of the bed in the gas stream to a secondary combustion chamber. Although this process makes it possible to separate the fibers from the resin of a composite, it exhibits the disadvantage of degrading the fibers, such as glass or carbon fibers, which experience a decline in their mechanical properties. Another part of the fibers and of the partially decomposed polymer is withdrawn from the reactor continuously, at the same time as the sand. The sand containing the residual polymer is led into an incineration chamber where the sand is reheated and the residual polymer incinerated. The sand brought to a high temperature is then returned to the reactor, where it is mixed with the sand already present and with polymer/composite.

Thus, there exist methods for recycling thermoplastic resin and/or thermoplastic composite material sometimes including a depolymerization of the polymer resin. However, these methods are not efficient in terms of processing time and of energy cost. In addition, the production of starting monomer by these methods is generally not satisfactory in terms of yield and/or of quality for reuse in the preparation of thermoplastic resin and/or of composite comprising a thermoplastic resin.

The document WO00/39205 describes a process for recycling an article. The article comprises a thermoplastic polymer resin.

The document JPH11166184 describes a process for the stabilization of a pyrolyzed oil, composed of polymers which are intended for scrap, which is obtained from plastic waste.

The document EP3023478 describes a process for the recycling of composite materials capable of recovering fibers originating from parts of composite materials or fabrics preimpregnated with polymers.

Technical Problem

The aim of the invention is thus to overcome at least one of the abovementioned disadvantages of the prior art.

The invention is targeted in particular at providing a simple and effective solution for recycling an article comprising a thermoplastic polymer resin, while minimizing the energy consumption and without thermal degradation of the possible other materials present.

Brief Description of the Invention

To this end, a first aspect of the invention provides a process for the recycling of an article comprising a thermoplastic polymer P1 resin, said thermoplastic polymer P1 having been formed from base monomers, said process comprising the following stages:

>   heating said resin in order to convert, at least in part, the thermoplastic polymer P1 into at least two polymers P2, said at least two polymers P2 having a lower molar mass than the molar mass of said polymer P1,
>
>   cooling said at least two polymers P2 obtained after heating to a temperature substantially equal to or lower than the boiling point of said base monomers, and
>
>   dissolving said at least two polymers P2 in a solution comprising said base monomers.

The invention is targeted at obtaining polymers of reduced molar mass with respect to the starting polymer, said polymers P2 then being able to be dissolved rapidly in their base monomer so as to be, for example, reintroduced into a circuit for the manufacture of a new article. Thus, the heating, preferably local, of the resin makes it possible to initiate a depolymerization of the polymer P1. When the heating is carried out locally over one or more zones, it makes it possible to initiate the depolymerization of the polymer P1 at the end of the polymer chain or at many points of the polymer chain. There may then be formed a mixture of polymers P2 exhibiting a reduced molar mass with respect to the initial polymer P1 and there may also be formed the base monomer when the depolymerization is initiated at the chain end. Preferably, the molar mass of the polymer chain is thus greatly reduced with the result that the polymers P2 can be recovered by dissolution in the base monomer.

According to other optional characteristics of the process:

>   the thermoplastic polymer P1 resin of the article is a resin based on poly(methyl methacrylate), on polystyrene or on a mixture of these polymers;
>
>   the thermoplastic polymer P1 resin is a poly(methyl methacrylate) resin;
>
>   the article based on thermoplastic polymer P1 resin is an article made of composite material which additionally comprises a reinforcement and the process additionally comprises a stage of filtration of solids after the stage of dissolution of the polymers P2 in the base monomer;
>
>   the heating stage is repeated until a loss in weight of the thermoplastic polymer P1 resin of at least 10%, with respect to the initial total weight of the polymer P1 resin, is obtained. Advantageously, this loss in weight corresponds to a depolymerization of at least 10%, with respect to the initial total weight of the polymer P1 resin, and thus to the formation of base monomer which is in the gaseous state under the depolymerization conditions;
>
>   the heating stage is repeated until a loss in weight of the thermoplastic polymer P1 resin of between 10% and 90%, with respect to the initial total weight of the polymer P1 resin, is obtained;
>
>   the heating stage consists in locally heating several zones of the resin, and is carried out by means of pulsed electric fields or of microwaves;
>
>   the pulsed electric fields correspond to a plurality of electric discharges. Advantageously, the voltage between electrodes which generates said discharge, the switching time and the discharge frequency are such that each discharge carries out a localized heating making it possible to obtain said at least two polymers P2 of lower molar mass than the molar mass of the polymer P1;
>
>   the heating stage consists in heating by pulses with a duration of between 1 and 1000 µs, preferably of between 10 and 500 µs and more preferably of 10 to 100 µs;
>
>   said base monomers included in the solution used to dissolve said at least two polymers P2 originate at least in part from the recycling of another article based on thermoplastic polymer P1 resin. This makes it possible to increase the amount of base monomer and thus to increase the rate of dissolution of the polymers P2;
>
>   the local heating temperature is greater than 300° C., preferably between 350° C. and 450° C. The temperature measurement can preferably be carried out using an optical pyrometer in order not to have a probe in direct contact with the material and exposed to the pulsed fields.

The invention additionally relates to a system for recycling an article comprising a thermoplastic polymer P1 resin, said thermoplastic polymer P1 having been formed from base monomers, said system being characterized in that it comprises:

>   a chamber for receiving said article, said chamber being equipped with means for heating said resin so as to convert, at least in part, the thermoplastic polymer P1 into at least two polymers P2, preferably said at least two polymers P2 having a lower molar mass than the molar mass of said polymer P1,
>
>   a heat exchange device configured in order to cool the at least two polymers P2,
>
>   a device for bringing the at least two polymers P2 into contact with a solution comprising the base monomers, and
>
>   a recovery device configured in order to collect the at least two polymers P2 dissolved in the solution comprising the base monomers.

According to other optional characteristics of the system:

>   it comprises a collection means capable of collecting a mixture of base monomer in the gaseous state;
>
>   it comprises a condensation unit capable of condensing the mixture of base monomer in the gaseous state;
>
>   the article is an article made of composite material additionally comprising a reinforcement and the chamber additionally comprises a filtration means capable of retaining solids insoluble in the base monomer;
>
>   it comprises an injection means capable of introducing, into the chamber, a base monomer in the liquid state. In this case, preferably, the monomer injection takes place when the polymers P2 have been cooled.

BRIEF DESCRIPTION OF THE DRAWINGS

Other characteristics and advantages of the invention will become apparent on reading the following description made by way of illustration and without limitation, with regard to the appended figures, which represent.

DESCRIPTION OF THE INVENTION

Figure 1:
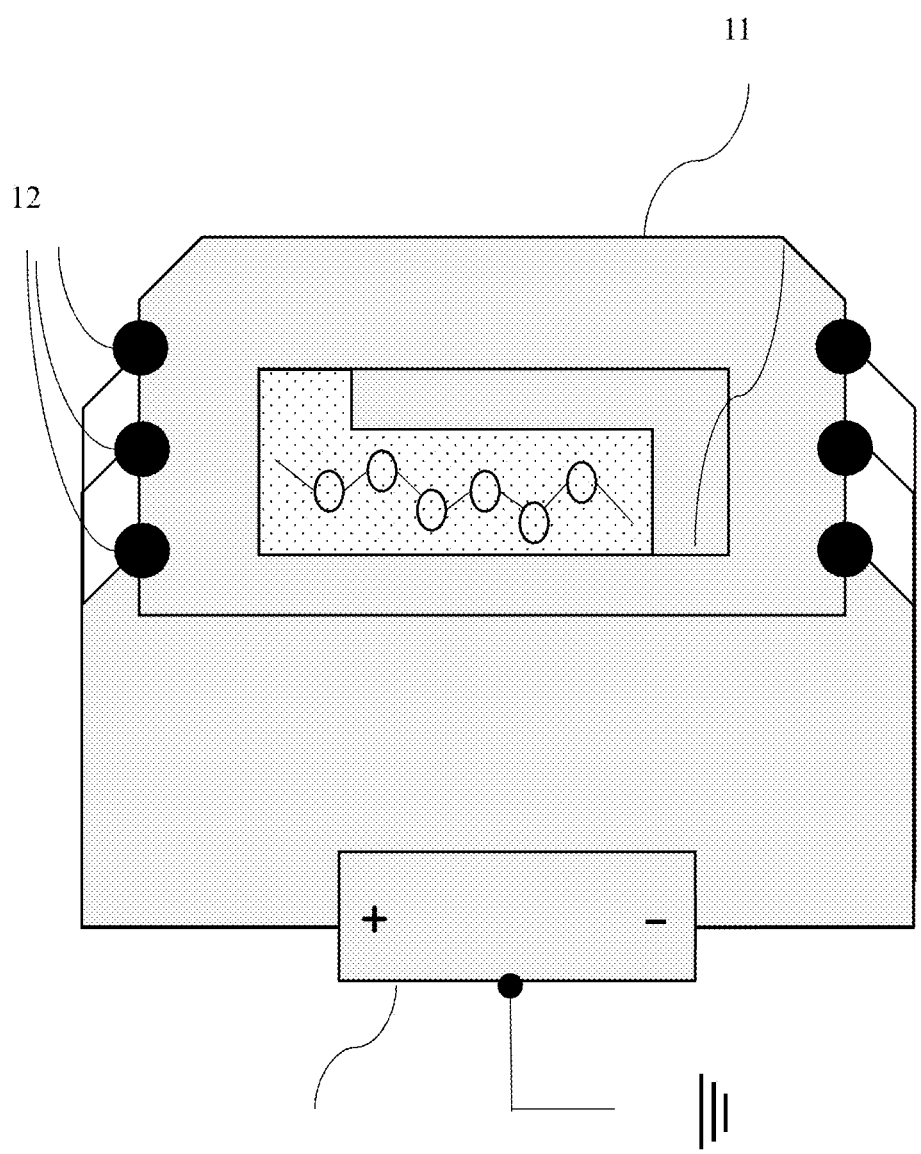
FIG. 1, a simplified diagram of a device for the implementation of a recycling process according to one embodiment.

In the continuation of the description, the term "monomer" is understood to mean a molecule which can undergo a polymerization.

The term "polymerization" as used relates to the process for the conversion of a monomer or of a mixture of monomers into a polymer.

The term "depolymerization" as used relates to the process for the conversion of a polymer into one or more monomer(s) and/or oligomer(s) and/or polymer(s) of smaller molar mass than the initial polymer.

The term "polymer" is understood to mean either a copolymer or a homopolymer. A "copolymer" is a polymer grouping together several different monomer units and a "homopolymer" is a polymer grouping together identical monomer units.

The term "thermoplastic polymer" is understood to mean a polymer which, repeatedly, can be softened or melted under the action of heat and which adopts new shapes by application of heat and of pressure. Examples of thermoplastics are, for example: poly(methyl methacrylate) (PMMA), or also polystyrene (PS).

The term "(meth)acrylic polymer" is understood to mean a homopolymer or a copolymer based on (meth)acrylic monomer which is, for example, chosen from methyl methacrylate, ethyl methacrylate, methyl acrylate, ethyl acrylate, methacrylic acid, acrylic acid, n-butyl acrylate, isobutyl acrylate, n-butyl methacrylate, isobutyl methacrylate, cyclohexyl acrylate, cyclohexyl methacrylate, isobornyl acrylate, isobornyl methacrylate and their mixtures. Poly(methyl methacrylate) (PMMA) is a particular example of a (meth)acrylic polymer obtained by polymerization of a methyl methacrylate monomer. The term "PMMA", within the meaning of the invention, denotes homo- and copolymers of methyl methacrylate (MMA), the ratio by weight of MMA in the PMMA preferably being at least 70% by weight for the MMA copolymer.

The term "copolymer based on methyl methacrylate" is understood to mean a copolymer having at least one methyl methacrylate monomer. For example, a copolymer based on methyl methacrylate can be a copolymer comprising at least 70%, preferably 80%, advantageously 90%, by weight of MMA in the PMMA.

The term "base monomer" is understood to mean the most important constituent monomer unit of a polymer. Thus, in PMMA, the base monomer is MMA.

The term "molar mass" is understood to mean the weight of one mole of a substance, expressed generally in grams per mol (g/mol). When this applies to a polymer, the molar mass corresponds more particularly to the weight-average molar mass.

The term "polymers of reduced molar mass" is understood to mean at least two polymers P2, resulting from a polymer P1, and the molar mass of which is less than the molar mass of the starting polymer P1. Such polymers P2 of reduced mass exhibit the advantage of being able to dissolve in the base monomer when the initial polymer P1 is itself soluble in its base monomer. The polymer P1, which is longer, dissolves more slowly than the polymers P2. These polymers P2 can also be provided in the form of oligomers. Preferably, a polymer P2 exhibits an average molar mass of 70% or less of the average molar mass of the polymer P1, more preferably 50% or less and more preferably still 40% or less.

The term "polymer resin" is understood to mean a material acting as binder. The "resin" comprises polymers, including the polymer P1. Thus, a "(meth)acrylic polymer resin" refers to any type of acrylic and methacrylic polymer, oligomer or copolymer compound. However, it would not be departing from the scope of the invention if the (meth)acrylic polymer resin comprised up to 10% by weight, preferably less than 5% by weight, of other nonacrylic monomers chosen, for example, from the following group: butadiene, isoprene, styrene, substituted styrene, such as α-methylstyrene or tert-butylstyrene, cyclosiloxanes, vinylnaphthalenes and vinylpyridines.

The term "reinforcement" is understood to mean, within the meaning of the invention, a solid material which is nondepolymerizable or nongasifiable, which thus remains at the end of the treatment, such as a fibrous reinforcement or a mineral filler.

For the purposes of the invention, the term "fibrous reinforcement" means a plurality of fibers, unidirectional rovings or a continuous filament mat, fabrics, felts or nonwovens which may be in the form of strips, webs, braids, strands or parts.

The term "mineral filler" is understood to mean, within the meaning of the invention, any inert substances of mineral nature which can be added to a thermoplastic polymer so as to improve the mechanical properties of the composite article or to reduce its cost price. The mineral fillers can, for example, be quartz, marble or silica.

The term "sensitizing compound for the depolymerization by microwaves" is understood to mean a compound which absorbs microwave electromagnetic radiation and releases it in the form of heat. In other words, the sensitizing compound for the depolymerization by microwaves is a material with a high dielectric loss factor, for example of greater than 0.1 at a frequency of between 900 MHz and 2500 MHz and at 25° C., and/or a high dielectric constant, for example of greater than or equal to 5 at a frequency of between 900 MHz and 2500 MHz and at 25° C., so that the exposure of the material to microwave electromagnetic radiation will be reflected by a rapid heating of said material, and/or a loss angle tangent of greater than or equal to 1 at a frequency of between 900 MHz and 2500 MHz and at 25° C.

The term "relative permittivity or dielectric constant of a material or of a substance" is understood to mean the property of this material or substance to polarize, that is to say the ability to be oriented by the electric field.

The term "dielectric loss factor" for the sensitizing compound for microwaves is understood to mean the inherent dissipation of electromagnetic energy from a dielectric material (for example heat). It can be calculated as a function of the loss angle δ or of the corresponding loss tangent tan S. It reflects the efficiency of the conversion of the energy of the electric field into heat. Thus, the dielectric loss factor makes it possible to assess the ability of a material to heat up under the action of microwave radiation.

The term "substantially equal" is understood to mean, within the meaning of the invention, a value varying by less than 30% with respect to the comparative value, preferably by less than 20%, more preferably still by less than 10%.

In the description of the embodiments which will follow and in the appended figures, the same references are used to designate the same elements or similar elements.

According to a first aspect, the invention relates to a process for the recycling of an article comprising a thermoplastic polymer P1 resin and in particular an article made of composite material comprising a reinforcement and a thermoplastic resin matrix.

The thermoplastic polymer P1 resin is a resin comprising thermoplastic polymers, such as linear or branched polymers, which are noncrosslinked and exhibit a degree of malleability, thus facilitating their shaping by application of heat and pressure. Thermoplastics regain their initial stiffness after cooling, without, however, the resin being thermally degraded.

The weight-average molar mass ($M_w$) of the thermoplastic P1 resin is preferably high, that is to say greater than 50 000 g/mol and preferably greater than 100 000 g/mol. The weight-average molar mass can be measured by size exclusion chromatography.

More particularly, the thermoplastic polymer resin is a resin based on poly(methyl methacrylate), on polystyrene or on a mixture of these polymers.

More particularly, the thermoplastic polymer resin is a resin based on a thermoplastic polymer soluble in its monomer. For example, a PMMA-based resin is soluble in its monomer, MMA, according to a ratio of 100 kg of PMMA per 2 tonnes of MMA. Nevertheless, the solubility depends on the molar mass of the polymer, on the temperature and on the duration of dissolution.

The thermoplastic polymer P1 resin is preferably a (meth)acrylic polymer. It can be obtained from the polymerization of a liquid (meth)acrylic composition, also called "syrup" or "prepolymer", comprising, as described in WO2013056845 and WO2014013028, a (meth)acrylic monomer or a mixture of (meth)acrylic monomers and/or a (meth)acrylic oligomer and/or a (meth)acrylic polymer and at least one radical initiator.

In particular, the thermoplastic polymer resin can be a poly(methyl methacrylate) (PMMA) resin. In particular, such a PMMA can be the product marketed by Arkema under the name Altuglas® and comprising at least one methyl methacrylate monomer.

The base (meth)acrylic monomer of the (meth)acrylic polymer P1 is a monomer of the following type: acrylic acid, methacrylic acid, an alkyl acrylate monomer, an alkyl methacrylate monomer, a hydroxyalkyl acrylate monomer or a hydroxyalkyl methacrylate monomer, or a mixture of these.

More particularly, this base (meth)acrylic monomer can be methyl methacrylate, ethyl methacrylate, methyl acrylate, ethyl acrylate, methacrylic acid, acrylic acid, n-butyl acrylate, isobutyl acrylate, n-butyl methacrylate, isobutyl methacrylate, cyclohexyl acrylate, cyclohexyl methacrylate, isobornyl acrylate, isobornyl methacrylate, hydroxyethyl acrylate and hydroxyethyl methacrylate, and a mixture of these.

Local Heating

The thermoplastic polymer P1 resin is heated so as to convert, at least in part, the thermoplastic polymer P1 into at least two polymers P2.

The depolymerization of an initial polymeric resin can lead to the base monomer of the initial polymer and/or to polymers P2 of lower molar mass than that of the initial polymer P1. A polymer P2 of lower molar mass is a polymer, the chain length of which is reduced with respect to the chain length of the initial polymer P1. The base monomer and the polymers P2 of lower molar mass can be reused in plastics industry processes for the purpose of the recycling thereof to give industrial products.

In order to obtain polymers P2 of reduced mass, one embodiment of the recycling process according to the invention consists in heating the article comprising a thermoplastic polymer P1 resin. This heating can be applied to all of the starting polymer P1 resin and/or else locally to one or more zone(s) of the starting polymer P1. Thus, the process for the recycling of an article comprising a thermoplastic polymer P1 resin according to the invention is a process in which the thermoplastic polymer P1 resin is at least partially depolymerized. Preferably, the heating is carried out locally, that is to say that it is not the entire article which is heated but one or more zones of the resin. This can lead to significant energy savings, in particular when the article is a composite article comprising more than 50% by weight, preferably more than 70% by weight and more preferably more than 80% by weight of reinforcement. This is because the heating of the reinforcement (i.e., nondepolymerizable material) can represent an energy consumption as great as the depolymerization of the polymeric fraction.

Preferably, the heating is carried out locally, that is to say that it is not the entire thermoplastic polymer P1 resin which is heated but one or more zones of the resin.

Nevertheless, in the context of the invention, it would be possible to carry out a preliminary overall heating, preferably not causing depolymerization, up to a temperature of less than 200° C., before carrying out the local heating. This is a preheating or a preheating stage. Thus, the local heating is improved thereby, as will be described in detail subsequently.

Preferably, the heating is applied to several zones of the constituent polymeric chain of the polymer P1. In this case, certain zones of the article not subjected to heating are not affected and are not thermally damaged by said heating. Thus, when the article is made of composite material, that is to say comprising a thermoplastic resin matrix intimately connected to a reinforcement, the localized heating on certain zones of the article makes it possible to preserve the quality of the materials, such as the fibers of the fibrous reinforcements, for example. This is because the fibers, such as, for example, glass fibers, not subjected to a high temperature, are not thermally damaged and can thus be used again to form new fibrous reinforcements, for example.

Another advantage of this localized heating on certain zones of the resin P1 lies in the fact that it makes it possible to minimize the energy consumption. This is because it is not necessary to heat the entire body of the polymer to high temperature; thus, in the case of a high percentage by weight of reinforcement (e.g. inorganic material), localized heating makes it possible to avoid the energy consumption which would have been necessary in order to heat all of the material and thus the inorganic material also.

This heating on one or more zone(s) makes it possible to split the polymeric chain P1 into several fragments corresponding to polymers P2 of reduced molar mass. Thus, by virtue of the local heating carried out on one or more zones, it is possible to rapidly obtain several polymeric fragments P2 of reduced mass. These polymers P2 of reduced mass can subsequently be dissolved, more rapidly, in their base monomer.

According to a particular embodiment, the heating is carried out and/or repeated until a loss in weight of the thermoplastic polymer P1 resin of at least 10%, with respect to the initial total weight of the resin, is obtained, preferably until a loss in weight of 10% to 90% is obtained; more preferably, the heating is carried out and/or repeated until a loss in weight of the thermoplastic polymer P1 resin of 10% to 60% and of more preferably still of 10% to 40%, with respect to the initial total weight of the resin, is obtained. The loss in weight of the resin corresponds to a depolymerization essentially leading to the formation of the base monomer in the liquid or gaseous state. Thus, the loss in weight of the resin is predominantly reflected by the formation of the monomer. The heating is carried out and/or repeated until from 10% to 90% by weight of the polymer resin is converted into base monomers. Preferably, the heating is carried out and/or repeated until from 10% to 60% by weight of the polymer resin is converted into base monomers and more preferably still until from 10% to 40% by weight of the polymer resin is converted into base monomers. In other words, the heating stage is repeated until a degree of depolymerization of between 10% and 40% is obtained.

The overall heating time can, for example, be between a few seconds and several minutes. The heating time can thus be between 1 and 240 minutes. Preferably, the heating is carried out periodically.

Heating by Pulsed Electric Fields

In one embodiment, the heating stage is carried out by means of pulsed electric fields. The heating by means of pulsed electric fields is a heating obtained by application of electric discharges. In order to heat by means of electric discharges, it is possible to use a device comprising in particular one or more chamber(s), electrodes and a current generator. The current generator is usually a high voltage and direct current generator and can be supplemented by capacitors and a switch. The high voltage generator allows the transformation of an alternating electric current into an intermittent current in the form of pulses. The electrical energy can be temporarily stored at the electrodes. Depending on the design of the generators, it is possible to obtain different shapes of electrical pulses, such as exponential decay pulses and square pulses.

The heating stage carried out by means of a pulsed electric field can be based on the application of an electric field in the form of a pulse of very short period (of the order of a micro- to a millisecond). The exposure of articles comprising a polymer P1 resin to a given electric field (expressed in kV/cm) causes local heating points leading to rupture of the polymer chains. The intensity of the field depends on the nature of the cell (formed of the chamber, the electrodes and the current generator). The application of short-term pulses creates local instabilities at the polymer chain.

The application of the electric field by a generator can thus correspond to the treatment of an article, batchwise or continuously, between two electrodes, so as to subject it to a pulsed electric voltage. In order to be able to carry out high voltage discharges, the generator comprises high voltage capacitors for storing electrical energy. This energy is released in very short times through a fast switching system in the discharge circuit, and the power thus pulsed is very high. Advantageously, the generator is appropriate for delivering pulses repeatedly. These electrical pulses can be of positive or negative polarity, of square or sinusoidal shape, for example.

The pulses can reach a power of the order of a megawatt; for example, they can be between 100 W and $10^8$ MW.

The corresponding voltage between the electrodes can be between 20 kV and 200 kV. The voltage will in particular be dependent on the size of the electrodes. Thus, it will preferably be between 1 and 1000 kV/cm.

The pulses can be of a duration of the order of a few microseconds (µs) up to a few milliseconds; for example, they can be between 1 and 1000 µs, preferably between 5 and 200 µs, more preferably between 10 and 100 µs.

The discharge frequency or frequency of the pulses can be between 1 and 300 kHz, preferably between 5 and 225 kHz or between 10 and 40 kHz.

The current between the electrodes can range from 8 to 100 kA depending on the generator.

Repeated and/or successive pulses can in particular generate an electric discharge in the form of an electric arc. The electric arc is due to the passage of a strong electric current which causes a significant rise in temperature resulting from the dissipation of energy by the Joule effect.

Depending on the energy stored in the generator, the intensity, the voltage between the electrodes, the discharge time and frequency, the heating by pulsed electric fields can lead to the fragmentation of the polymeric chain of the polymer P1 and to polymers P2 of reduced molar mass being obtained, and/or can make possible the formation of the base monomer(s).

Thus, the heating of the thermoplastic polymer resin can be carried out by successive electric discharges in order to form a desired amount of base monomer. According to a specific embodiment, the electric discharges can be repeated, in order to heat the starting polymer P1 and/or the polymer(s) of reduced mass P2 until at least 10% by weight of the polymer resin is converted into base monomer(s).

In another preferred embodiment, the heating of the article 10 is carried out locally, on one or more zones, by means of pulsed electric fields. This is because, placed between the electrodes, the article to be recycled, in particular the thermoplastic polymer resin of the article, can be heated in one or more zones of the polymeric chain, thus making possible localized heating in these zones, the heating being obtained by virtue of the application of pulsed electric fields as described above.

Heating by Microwaves

In an alternative embodiment, the stage of heating the article 10 to be recycled can be carried out by means of microwave radiation.

The irradiation can be carried out in the presence of a sensitizer for the depolymerization by microwaves (i.e., by microwave radiation). The sensitizer for the depolymerization by microwaves can be present in the article to be recycled or else added before the heating stage. Preferably, it is present in the article to be recycled, such as, for example, in the thermoplastic polymer P1 resin.

Preferably, the dielectric loss factor of the sensitizer for the depolymerization by microwaves is greater than or equal to 0.1 at a frequency of between 900 MHz and 2500 MHz and at 25° C., more preferably greater than or equal to 0.2 and more preferably still greater than or equal to 10. Thus, the sensitizing compound absorbs microwave energy more rapidly than the thermoplastic polymer, then dissipates this energy in the form of heat, thus causing rapid heating. More preferably, the dielectric loss factor of the sensitizer for the depolymerization by microwaves is greater than or equal to 0.2 at 2.45 GHz and 25° C. and more preferably still the dielectric loss factor of the sensitizer for the depolymerization by microwaves is greater than 10 at 2.45 GHz and 25° C.

Preferably, the sensitizing component exhibits a dielectric constant of greater than or equal to 5 at a frequency of between 900 MHz and 2500 MHz and at 25° C., more preferably of greater than or equal to 20 and more preferably still of greater than or equal to 50. More preferably, the sensitizing compound exhibits a dielectric constant of greater than 20 at 2.45 GHz and 25° C. and more preferably still of greater than 50 at 2.45 GHz and 25° C.

Preferably, the sensitizing compound exhibits a loss angle tangent of greater than or equal to $10^{-4}$ at a frequency of between 900 MHz and 2500 MHz and at 25° C., more preferably of greater than or equal to $10^{-2}$ and more preferably still of greater than or equal to 0.1, for example of greater than or equal to 0.5. Thus, the sensitizing compound will be able to absorb a significant amount of energy originating from microwave radiation. More preferably, the sensitizing compound exhibits a dielectric constant of greater than 20 at 2.45 GHz and 25° C. and more preferably still of greater than 50 at 2.45 GHz and 25° C.

The dielectric loss factor and the dielectric constant are parameters which depend in particular on the frequency applied and on the temperature of the material. Preferably, these parameters are measured according to the method described in the document "Chauffage diélectrique—Principes et spécificités" [Dielectric Heating—Principles and Specific Aspects], Techniques de l'Ingénieur, D 5 940-1, Roussy G. et al., 2008.

For example, a sensitizer for the depolymerization by microwaves can be:
- an oxide, such as $Al_2O_3$, $(Ba_{1-x}Sr_x)TiO_3$, $BaTiO_3$, $Ba(Zr_xTi_{1-x})O_3$, $Ca$—$Si$—$Al$—$O$, $CaTiO_3$, $Cr_2O_3$, $CuO$, $Fe_2O_3$, $Fe_3O_4$, $LaAlO_3$, $LaCrO_3$, $MnO_2$, $NiO$, $(Pb_{1-x-y}La_xZr_y)TiO_3$, $(Pb_xMg_{1-x})NbO_3$ and $PbTiO_3$, $Ta_2O_5$, $TiO_2$, $YBa_2Cu_3O_7$, $ZnO$, $ZrO_2$, $SrTiO_3$, $Sr(Zr_xTi_{1-x})O_3$, $FeO(OH)$, $PbTiO_3$, $MgTiO_3$, $(Pb_xMg_{1-x})NbO_3$, $Ta_2O_5$, $(Zr_xSi_{1-x})O_2$, $MgCO_3$, with x, y and x+y between 0 and 1 (limits included);
- a nonoxide, such as $CrB$, $Fe_2B$, $FeSi$, $Mg$, $Si$;
- a carbide, such as silicon carbide $SiC$;
- calcium aluminate;
- a carbonaceous filler, such as carbon black, graphite, activated carbon, carbon nanotubes, charcoal;
- ferrites, such as bismuth ferrite ($BiFeO_3$);
- a metal complex, such as $YBa_2Cu_3O_7$, $LaCrO_3$, $CuO$, $CuFeS_2$, $ZnCl_2$, Ni-phosphate, chalcopyrite, cordierite, zeolite, steatite;
- a nitride, such as aluminum nitride, boron nitride;
- a silicate;
- a fluoride, such as cerium fluoride, $(Ba_{1-x-y}Ca_xSr_y)F_2$;
- or their mixture.

Examples of sensitizer for the depolymerization by microwaves, with their dielectric properties at different frequencies, are given in table 1.

In particular, the sensitizing compound can be selected from: $SiC$, $TiO_2$, $ZrO_2$, $BaTiO_3$, $SrTiO_3$, $MgTiO_3$, $LaAlO_3$, ferrites, basalt and marble.

Preferably, the sensitizing compound can be selected from: $SiC$, $TiO_2$, $ZrO_2$ and marble.

Alternatively, the sensitizing compound can be selected from: ferrites, barium and/or strontium and/or calcium and/or magnesium titanates, $LaAlO_3$, $SiC$ and silicates, zeolites and $ZrO_2$.

The heating induced by microwaves exhibits the advantage of being rapid and localized in the zones containing the sensitizing compound.

The microwaves can be generated by a microwave generator, such as a magnetron or a klystron, with a frequency of, for example, between 10 MHz and 5.8 GHz and preferably of between 0.9 and 2.5 GHz. The time of irradiation by or of exposure to microwaves of an article to be treated is preferably of short duration. This frequency is variable according to the sensitizer, the depth of penetration or the power. The article is heated for short periods interrupted by cooling stages. This heating can be carried out repeatedly in order to obtain polymers P2 of reduced mass or until the base monomer is obtained, which can be condensed to the liquid state, in an appropriate tank, in an amount at least equal to 10% by weight of the resin. Advantageously, on the periphery of the zone which has been sufficiently heated to obtain the monomer, a zone will be present, the heating of which is less and can lead to polymers P2 of reduced molar mass.

TABLE 1

| Sensitizer | Measurement frequency (in MHz) | Dielectric constant | $10^4 \times$ Tan delta | Loss factor |
|---|---|---|---|---|
| $Al_2O_3$ | 1000 | 9.6-10 | 2 | 0.0019-0.002 |
| $Al_2O_3$ | 3600 | 9 | 5 | 0.0045 |
| Aluminum nitride | 8500 | 8 | 35 | 0.028 |
| Amber | 3000 | 2.6 | 90 | 0.0207 |
| $BaF_2$ | 1000 | 7.3 | 10 | 0.0073 |
| $BaTiO_3$ | 2450 | 200-16 000 | | 0.2-0.3 |
| $BiFeO_3$ | 9400 | 40 | 700 | 2.8 |
| Boron nitride | 8500 | 4.37 | 3 | 0.0013 |
| Boron nitride | 100 | 4.08 | 2.6 | 0.0011 |
| $CaF_2$ | 1000 | 6.5 | 10 | 0.0065 |
| Carbon black | 2500 | 20 | 5000 | 10 |
| Cerium fluoride | 60 | 15.8 | 2530 | 4 |
| Chalcopyrite | 2450 | 11.01 | 7284 | 8.02 |
| Ferrites | 1000-10 000 | 10-100 | 100-10 000 | 1-100 |
| Basalt | 8500 | 10.2 | 5600 | 5.7 |
| Basalt | 1000 | 3.51 | 481 | 0.1688 |
| $LaAlO_3$ | 1 | 350 | 10 | 0.35 |
| Limestone (Lucerne Valley) | 14 000 | 8.21-8.45 | 38-80 | 0.0311-0.0668 |
| Cordierite | 8520 | 4.8 | 25 | 0.012 |
| Magnesium carbonate | 8520 | 1.282 | 109 | 0.0139 |
| Magnesium metasilicate | 14,000 | 6.37 | 12 | 0.0076 |
| Magnesium orthosilicate | 8500 | 6.59 | 8 | 0.0053 |
| Marble | 1 | 8 | 400 | 0.24 |
| $MgOAl_2O_3$ | 4070-4023 | 8.28 | 1 | 0.0008 |
| $MgTiO_3$ | 10 | 20 | 100 | 0.2 |
| SiC | 1000 | 107 | 6860 | 73.4 |
| SiC | 3000 | 60 | 5800 | 34.8 |
| SiC | 8500 | 47.7 | 5500 | 26.2 |
| Silicon | 1000-10000 | 11.7-12.9 | 50-150 | 0.0585-0.19 |
| Sodium and silver nitrite | 9400 | 4.5 | <100 | <0.045 |
| $SrF_2$ | 1000 | 6.5 | 10 | 0.0065 |
| Steatite | 1000 | 6 | 20 | 0.012 |
| Strontium titanate | 1 | 200 | 5 | 0.1 |
| Strontium zirconate | 1 | 38 | 3 | 0.038 |
| $TiO_2$ | 1000 | 80 | 8-30 | 0.0640-0.24 |
| Zirconium silicate | 10 | 10 | 100 | 0.1 |
| $ZrO_2$ | 1000 | 30 | 33 | 0.1 |

This heating can be carried out by any device suitable for heating by microwave radiation. Just like the heating by pulsed electric fields, the heating by microwaves can also be carried out locally, on certain zones of the article 10.

In the case of the heating by microwaves and of a sensitizer for the depolymerization by microwave radiation, the molten polymer having stored heat absorbs the microwave radiation better than the solid polymer. This is because, as a result of the loss factor, which varies with the temperature, the hotter the polymer the more it absorbs the microwave radiation; thus, in the presence of a well-dispersed sensitizer, the heating is all the greater as the polymer heats up. Thus, the zones which are already hot are heated even more. Thus, it is no longer necessary to wait for heat to diffuse throughout the material. The phenomenon of local heating is thus intensified. In addition, in the presence of the sensitizer, the heating is centered on the latter, which is more favorable in the case of composites.

The recycling process according to the invention also comprises a stage of cooling the at least two polymers P2 obtained after heating. This cooling is preferably carried out until a temperature substantially equal to or lower than the boiling point of the base monomers is reached.

Preferably, the cooling stage is carried out until a temperature lower than the boiling point of the base monomers is reached. It can, for example, be carried out down to a temperature of less than or equal to 250° C., preferably of less than or equal to 150° C., more preferably of less than or equal to 100° C. The temperature nevertheless remains preferably greater than 30° C., more preferably greater than 50° C. and more preferably still greater than 75° C.

The cooling of the at least two polymers P2 also corresponds to the cooling of the thermoplastic polymer resin if the at least two polymers P2 have not been separated from said resin.

The cooling of the polymers P2 of reduced molar mass can be a passive cooling (passive dissipation of the energy) or else an active cooling. Preferably, the cooling of the polymers P2 corresponds to an active cooling.

For example, the at least two polymers P2 can be sprayed with base monomers in the liquid state, thus at a temperature of less than 110° C. In this case, the solution of base monomers in the liquid state advantageously comprises one or more stabilizers or polymerization inhibitors. The stabilizer can, for example, be phenothiazine, hydroquinone monomethyl ether (HQME), hydroquinone (HQ) or p-benzoquinone.

Advantageously, the cooling stage can comprise a heat recovery stage.

The recycling process according to the invention also comprises a stage of dissolution of the at least two polymers P2. This dissolution is carried out in a solution comprising the base monomers.

The base monomer results, for example, from the depolymerization of the starting polymer P1. By virtue of its reduced molar mass, the dissolution of the polymer P2 in the base monomer is easier and faster than the dissolution of the polymer P1 in the same base monomer. The invention thus makes possible the rapid and efficient depolymerization of an article comprising a thermoplastic polymer P1.

For example, a polymer P1 soluble in its base monomer can be poly(methyl methacrylate). The average molar mass of a (meth)acrylic polymer P1 is generally high, typically greater than 50 000 g/mol, preferably greater than 100 000 g/mol. A polymer P2 of reduced molar mass is then a polymer, the molar mass of which is less than 100 000 g/mol, preferably less than 50 000 g/mol and more preferably less than 10 000 g/mol. The polymer P2 exhibiting a molar mass of 10 000 g/mol or less dissolves more rapidly in its base monomer, for example methyl methacrylate, than the (meth)acrylic polymer P1.

The dissolution stage can comprise bringing into contact a large amount of base monomer with respect to the weight of polymer since the solubility of the polymer can be quite low. Thus, the process can comprise a stage of bringing into contact at least one times the amount by weight of base monomer with respect to the initial weight of the article to be recycled, preferably at least 1.5 times, more preferably at least 2 times and more preferably still at least 3 times. In addition, the greater the amount of base monomer introduced, the faster the dissolution will be.

The amount of base monomer necessary for the dissolution of the polymers P2 is generally high. Thus, advantageously, the process according to the invention comprises a stage of complete depolymerization of the polymers P2, for example within a secondary depolymerization unit, so as to produce base monomer which can be used for the dissolution of the polymers P2 originating from other articles to be recycled. Alternatively, MMA not originating from the depolymerization of the polymers can be used.

The process according to the invention can also comprise a stage of recovery of base monomers in the gaseous state, formed during the stage of heating the resin.

In this case, advantageously, the process according to the invention comprises a stage of condensation of these base monomers in the gaseous state so as to obtain a solution comprising the base monomers.

Preferably, this condensation can be carried out by bringing monomers in the gaseous state into contact with monomers in the liquid state. This contacting operation can, for example, be carried out in a device of shower type, by spraying the monomers in the liquid state (i.e., cold monomers) into a chamber collecting the base monomers in the gaseous state (i.e. hot monomers). In this case, the device can comprise a means for introduction of a stabilizer, or polymerization inhibitor. Such a contacting operation makes it possible to cool the polymers P2 and, in certain cases, more broadly the resin and the article, on the one hand, and to wash them, on the other hand.

The mixture obtained of polymers P2 dissolved in the base monomer is collected in a dedicated collection means. This mixture can then be either reused directly or sent to a secondary depolymerization unit in order to obtain only base monomer.

According to another aspect, the invention relates to a system for recycling an article comprising a thermoplastic polymer P1 resin.

The system according to the invention comprises in particular a chamber for receiving the article to be recycled. This chamber is advantageously equipped with means for heating the thermoplastic polymer P1 resin so as to convert, at least in part, the thermoplastic polymer P1 into at least two polymers P2.

This chamber can, for example, take the form of a corotating twin-screw extruder, of a co-kneader, of a fluidized bed or of an oven.

The system according to the invention also comprises a heat exchange device configured in order to cool the at least two polymers P2. The heat exchange device can be a direct contact or indirect contact heat exchanger.

Preferably, the heat exchange device is an indirect contact heat exchanger. Such a heat exchanger can be, for example, a tubular exchanger, a plate exchanger, having horizontal tubular bundles, having vertical tubular bundles, a spiral exchanger, a fin exchanger, or also a rotary or block exchanger. These examples are not limiting and a person skilled in the art will appreciate that other types of indirect contact heat exchangers can be used. An indirect contact heat exchanger can also employ a heat-exchange fluid. The heat-exchange fluid can be a liquid, for example water, a solvent or a mixture of these, molten salts or also synthetic oil; for example, such a synthetic oil can be the product sold by Arkema under the name Jarytherm (registered brand name).

The system according to the invention also comprises a device for bringing the at least two polymers P2 into contact with a solution comprising the base monomers. This device can take highly varied forms and can, for example, correspond to a device capable of comprising a bath of base monomers or also a device comprising a shower capable of bringing about spraying of base monomers over the at least two polymers P2. For example, the system according to the invention can additionally comprise an injection means capable of introducing, into the chamber, a base monomer in the liquid state.

The system 1 according to the invention also comprises a recovery device configured in order to collect the at least two polymers P2 dissolved in the solution comprising the base monomers.

In addition, when the article to be recycled comprises a composite material comprising a polymer resin and reinforcement, for example, it is possible to more easily separate the fiber from the polymeric mixture obtained by heating the article. For this, the system 1 according to the invention can additionally comprise a filtration means capable of retaining solids insoluble in the base monomer. Such a means can, for example, be provided in the form of a sieve, of a grid, of a settling unit or also of a centrifugation module.

The fibrous reinforcement generally refers to several fibers, unidirectional rovings or a continuous filament mat, fabrics, felts or nonwovens which can be in the form of strips, laps, braids, tufts or pieces.

Advantageously, the fibers not subjected to heating are not thermally damaged and can thus be reused for the purpose of manufacturing other fibrous reinforcements, for example.

With reference to FIG. 1, the system 1 can, for example, comprise a chamber 11 suitable for receiving an article 10 to be recycled and, optionally, a fluid. This is because a neutral gas or a liquid, such as water, can be introduced into the chamber containing the article to be recycled. To this end, the chamber comprises openings to make possible the introduction of the article and of the fluid, as well as means for discharging said fluid. In addition, the chamber can comprise pressure sensors, temperature sensors, a sieve or a grid, valves, means for heating the resin or one or more zone(s) of said resin for a predetermined period of time and at a given temperature and/or elements favoring the effect of an electric arc. This is because the product is introduced hot or cold and can also be heated and/or maintained at temperature during the treatment. The chamber is under vacuum or under a gas stream, to convey the monomer which forms to a condensation unit via a collection means. The condensation unit is more particularly suitable for condensing the mixture of base monomer in the gaseous state, while the collection means is more particularly suitable for collecting a mixture of base monomer in the gaseous state.

The chamber 11 comprises in particular at least two electrodes 12 which can be positioned opposite each other. These electrodes can be, for example, of point/plate type or in the form of a metal rail, and they can be an anode or a cathode. The article 10 to be recycled is placed between at least two electrodes. The distance between two opposing electrodes can be of the order of a centimeter or of the order of a meter. Advantageously, an electric discharge is generated between an anode-forming electrode and a cathode-forming electrode.

In order to heat the article to be recycled using electric discharges, the system comprises a current generator 13, for example a Marx generator. The generator generates electrical pulses and thus releases electrical energy in a discharge circuit to which the electrodes are connected.

Figure 2:
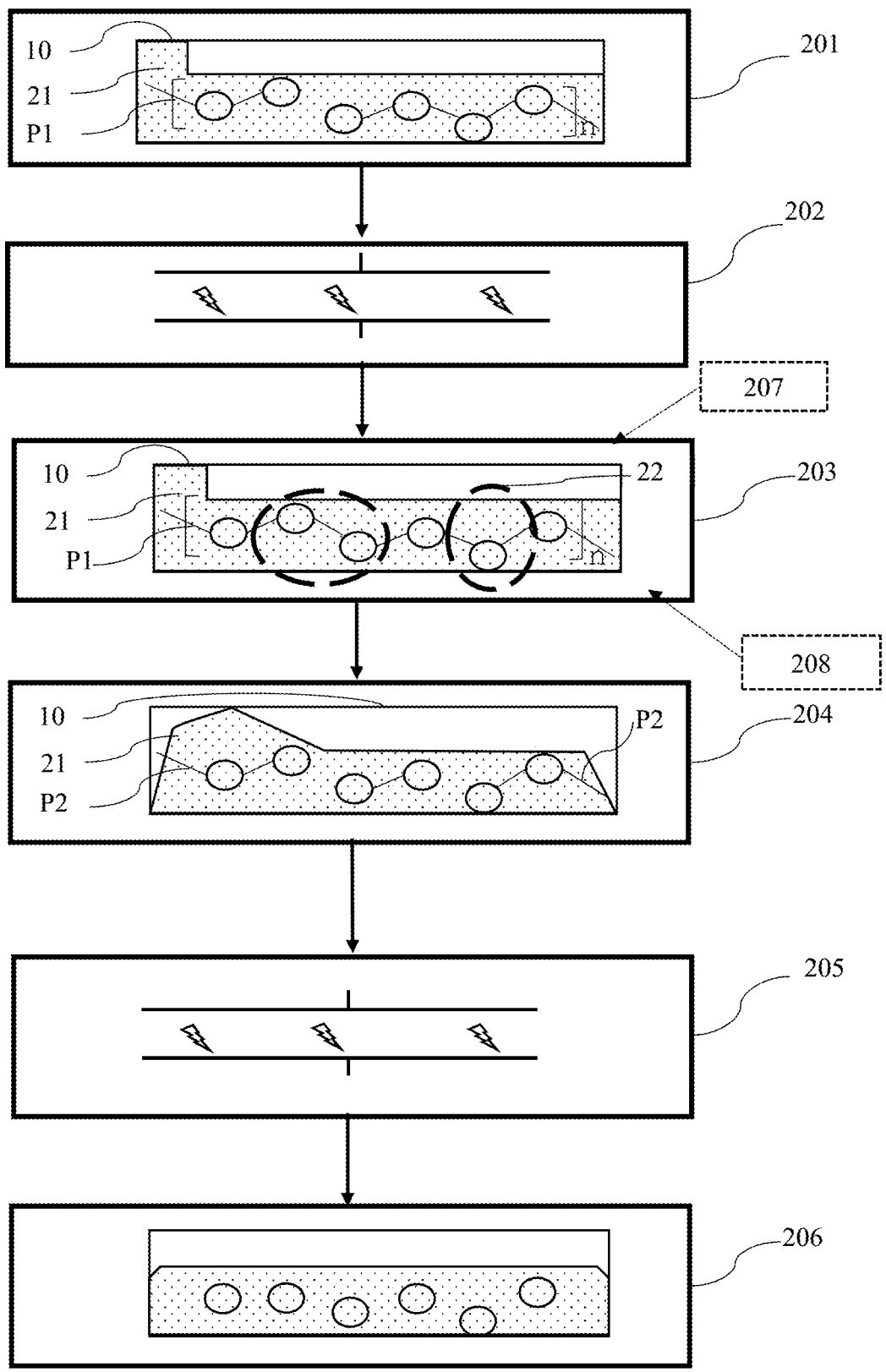
FIG. 2, a diagram schematically representing the stages of the recycling process according to one embodiment.

FIG. 2 illustrates a practical implementation of the stages of the recycling process according to the invention, which break down into stages 201 to 208. Thus, in a first stage 201, an article 10 comprising a thermoplastic polymer P1 resin 21 is placed in the chamber 11 suitable for a localized heat treatment of the article 10 by application of pulsed electric fields. According to a stage 202, electric discharges are generated by the generator 13. The parts of the article 10 subjected to these electric discharges are then heated locally 203 to a temperature of greater than 250° C., preferably of greater than 300° C.

This local heating is reflected by the heating of zone(s) 22 of the polymeric chain P1, the other zones of the chain not being affected by the heating. This heating can lead to several polymers P2 of reduced molar mass with respect to the molar mass of the polymer P1 of the resin, and is accompanied by a deformation of the resin, as illustrated in stage 204.

In a stage 205, the heating stage can be repeated, that is to say that the resin can be subjected to several electrical pulses, for example at least 300 electrical discharges for a duration of between 40 and 50 μs each, and each pulse each having an energy greater than 100 joules. The repetition of the electric discharges can lead, in a stage 206, to monomers being obtained.

The recycling process according to the invention can additionally comprise a filtration stage referenced 207, in dotted lines in FIG. 2. This filtration stage can be carried out using a filtration means, such as a sieve or a grid, in order to retain the elements insoluble in the base monomer. It occurs after the heating stage and thus makes it possible to separate, on the one hand, the mixture optionally comprising residual polymers P1 and/or polymers P2 and/or base monomers and, on the other hand, the residues insoluble in said mixture, such as inorganic materials and fibers. The mixture can be collected in a chamber provided for this purpose.

In an optional alternative form, represented diagrammatically in dotted lines in FIG. 2, the process comprises a stage 208 of introduction of monomer in the liquid state in which a base monomer, corresponding to the base monomer of the polymeric resin of the article to be recycled, is added at a temperature of between 25° C. and 80° C. and in liquid form after the heating stage 203. Such an addition advantageously makes it possible to dissolve the polymer P2 of reduced mass in the case where the heating does not lead to the base monomer or leads to an amount of monomer insufficient to make possible the dissolution of polymer P2. This addition can thus help in the dissolution, even when there is production of base monomer.

Advantageously, the base monomers added can originate from the recycling of another article. For example, from the depolymerization of the solution of polymer P2 in the monomer resulting from a preceding operation, or it can concern virgin monomer.

EXAMPLES

For the implementation of the examples according to the invention, samples of PMMA containing microwave sensitizers are prepared. Altuglas PMMA granules of V825 grade are mixed with a silicon carbide powder. The mixture is brought to a temperature of 210° C. so as to melt the PMMA and to obtain an intimate mixture of silicon carbide and PMMA. The molten mixture is placed in a mold so as to obtain squares of 10 cm*10 cm*1 cm.

The preceding example is reproduced without silicon carbide (reference sample).

Example 1—According to the Invention

A glass reactor (transparent to microwaves) is positioned in the microwave cavity. In its top part, the reactor is fitted with a condenser which makes it possible to recover the monomer which is produced, without returning it to the reactor or to the zone subjected to microwaves.

200 g of the PMMA plate containing the coarsely ground SiC of 1 to 2 cm are introduced into the reactor. The sample is preheated to approximately 130° C. A stream of microwaves is applied for 15 seconds at 2.45 GHz and a power of 1 kW. This operation is repeated 10 times with an interval of 10 s between each.

The product is then recovered and it has overall retained its initial shape; nevertheless, a greater surface roughness is observed. The sample is weighed in order to determine the loss in weight with respect to the initial sample. The loss in weight is 12% by weight.

The weight of monomer formed and trapped in the condenser is determined and gives a good indication of the depolymerization.

Example 2—According to the Invention

The preceding example is repeated, the exposure to microwaves being extended until a loss in weight of 20% by weight is reached, which loss is indicated by the weight of monomer recovered in the condenser and confirmed by weighing the remaining solid.

The solid present in the reactor is brought back to a temperature of 150° C. 1 liter of methyl methacrylate monomer stabilized with a polymerization inhibitor (hydroquinone at 300 ppm by weight) is then poured while leaving a headspace above the sample. The temperature of the suspension becomes established at 45° C. The mixture is stirred for 2 hours at this temperature, then the residual solid is filtered off and superficially dried. The weight of residual polymer is 25 g.

Example 3—Comparative

The preceding example is repeated with PMMA devoid of silicon carbide and for the same duration of exposure to the microwaves, even if the rate of production of monomer is lower. The weight of residual polymer after contact with the liquid monomer is 180 g.

Example 4—According to the Invention

Example 2 is repeated with a composite of PMMA and of carbon fibers containing 50% by weight of carbon fibers and for the same duration of exposure to the microwaves. The weight of residual composite after contact with the liquid monomer is 120 g.

The invention claimed is:

1. A process for the recycling of an article comprising a thermoplastic polymer P1 resin, wherein the article based on said thermoplastic polymer P1 is an article made of composite material which additionally comprises a reinforcement,
said thermoplastic polymer P1 having been formed from base monomers, said process comprising the following stages:
heating said resin by locally heating several zones of the resin in order to convert, at least in part, the thermoplastic polymer P1 into at least two polymers P2, said at least two polymers P2 having a lower molar mass than the molar mass of said polymer P1, wherein the locally heating several zones of the resin is carried out by means of pulsed electric fields at a temperature between 300° C. and 450° C.;
cooling said at least two polymers P2 obtained after heating to a temperature substantially equal to or lower than the boiling point of said base monomers,
dissolving said at least two polymers P2 in a solution comprising said base monomers; and
filtering solids from said reinforcement after dissolution of the polymers P2 in the base monomers.

2. The recycling process as claimed in claim 1, wherein the thermoplastic polymer P1 resin is a resin of poly (methyl methacrylate), of polystyrene or of a mixture of these polymers.

3. The recycling process as claimed in claim 1, wherein the thermoplastic polymer P1 resin is a poly (methyl methacrylate) resin.

4. The recycling process as claimed in claim 1, wherein the thermoplastic polymer P1 resin is a (meth) acrylic polymer.

5. The recycling process as claimed in claim 1, wherein the thermoplastic polymer P1 resin is a (meth) acrylic polymer comprising at least 70% by weight of methyl methacrylate.

6. The recycling process as claimed in claim 1, wherein the heating stage is repeated until a loss in weight of the thermoplastic polymer P1 resin of between 10% and 90%, with respect to the initial total weight of the polymer P1 resin, is obtained.

7. The recycling process as claimed in claim 1, wherein the pulsed electric fields correspond to a plurality of electric discharges.

8. The recycling process as claimed in claim 1, wherein the heating stage consists in heating by pulses with a duration of between 1 and 1000 µs.

9. The recycling process as claimed in claim 1, wherein said base monomers included in the solution used to dissolve said at least two polymers P2 originate at least in part from the recycling of another article based on said thermoplastic polymer P1 resin.

10. The recycling process as claimed in claim 1, wherein the local heating temperature is between 350° C. and 450° C.

11. The recycling process as claimed in claim 1, wherein the cooling stage is carried out down to a temperature of less than or equal to 250° C.

12. The recycling process as claimed in claim 1, wherein the cooling stage is carried out down to a temperature of greater than 30° C.

13. The recycling process as claimed in claim 1 wherein the cooling stage comprises a heat recovery stage.

14. The recycling process as claimed in claim 1, wherein the dissolution stage comprises a stage of bringing into contact at least one times the amount by weight of the base monomers with respect to the initial weight of the article to be recycled.

15. The recycling process as claimed in claim 1, wherein the process comprises a stage of recovery of the base monomers in the gaseous state, formed during the heating stage.

16. The recycling process as claimed in claim 1, wherein the process further comprises a preheating stage.

17. The recycling process as claimed in claim 16, wherein the process comprises a stage of preheating up to a temperature of less than 200° C.

* * * * *